Oct. 18, 1949.  M. MORGAN  2,485,504
RECIPROCABLE VALVE
Filed Nov. 28, 1945  3 Sheets-Sheet 1

INVENTOR
MYLES MORGAN
BY Albert G. Blodgett
ATTORNEY

Oct. 18, 1949.    M. MORGAN    2,485,504
RECIPROCABLE VALVE

Filed Nov. 28, 1945    3 Sheets-Sheet 2

INVENTOR.
MYLES MORGAN
BY
ATTORNEY

Oct. 18, 1949.   M. MORGAN   2,485,504
RECIPROCABLE VALVE

Filed Nov. 28, 1945   3 Sheets-Sheet 3

INVENTOR
MYLES MORGAN
BY
ATTORNEY

Patented Oct. 18, 1949

2,485,504

UNITED STATES PATENT OFFICE 2,485,504

RECIPROCABLE VALVE

Myles Morgan, Worcester, Mass., assignor to Morgan Construction Company, Worcester, Mass., a corporation of Massachusetts Application November 28, 1945, Serial No. 631,338

3 Claims. (Cl. 251—76)

This invention relates to reciprocable valves, and more particularly to valves of the type having a valve body which is bored to receive a piston, these parts being relatively slidable to control the flow of fluid in a desired manner.

Considerable difficulty has been encountered heretofore in preventing leakage with valves of this type. This is particularly true when controlling gaseous fluids, such as air, at very high pressures. It has been proposed to mount annular seals or packing rings of yieldable material within the valve body in surrounding relation to the piston. However it is found that the seals become rapidly worn by engagement with the edges of the ports in the piston when the valve is operated. The fluid pressure apparently distorts the seals and forces them partially into the ports during the relative sliding movement, so that they soon become cut or torn and are thereby rendered ineffective. Furthermore, the cost of these prior valves is high, since the valve bodies have to be made from two or more sparable parts in order to permit installation of the packing rings.

It is accordingly one object of the invention to provide a reciprocable valve which will operate efficiently and without leakage throughout a long life of useful service, even when handling high pressure gaseous fluids.

It is a further object of the invention to provide a highly efficient reciprocable valve which will be comparatively simple and inexpensive to manufacture.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a longitudinal section through a three-way valve, the section being taken on the line 1—1 of Fig. 4;

Figure 1:
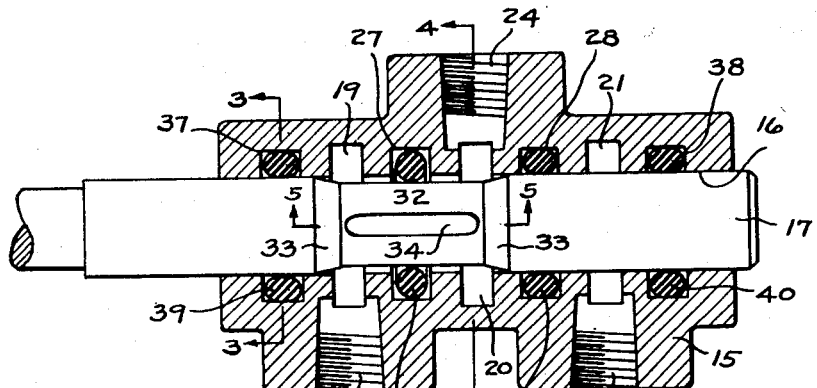

The embodiment illustrated in Figs. 1 to 5 inclusive comprises a valve body 15 provided with a cylindrical bore 16 therethrough for the reception of a cylindrical piston or plunger 17. The piston has a close sliding fit within the bore, any suitable means (not shown) being provided to move the piston between the positions indicated in Figs. 1 and 2 respectively. The bore 16 is enlarged by three axially spaced circumferential grooves 19, 20 and 21 which communicate respectively with openings 23, 24 and 25, these openings being threaded for convenience in the making of suitable pipe connections thereto. The groove 19 forms an inlet port or chamber, which may be connected with a suitable source of pressure fluid, and the groove 21 forms an exhaust port or chamber, from which the exhaust fluid may be discharged to any desired point. The groove 20, which is located between the grooves 19 and 21, forms a third port or chamber, and for lack of a better term this may be described as a "motor" chamber, since it will ordinarily be connected to a single-acting fluid operated motor.

Figure 2:
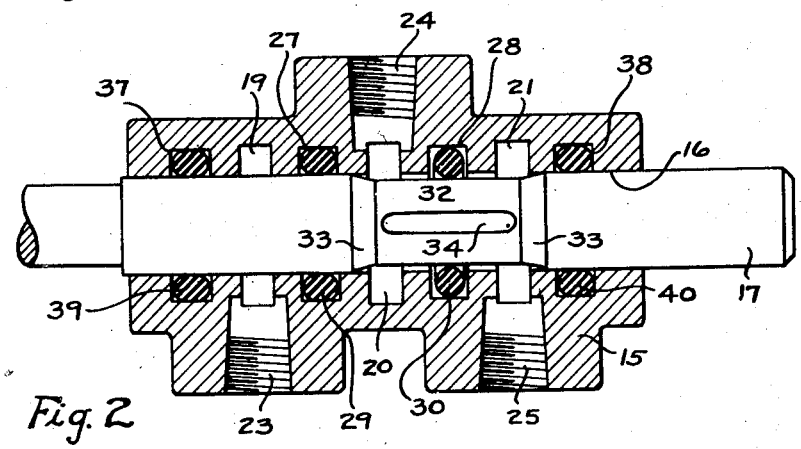
Fig. 2 is a view similar to Fig. 1, but showing the valve piston at the opposite end of its stroke.
Figures 3, 4, 5:
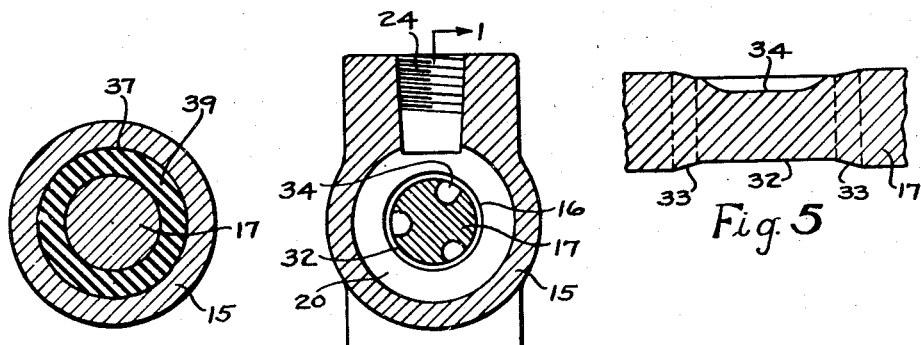
Fig. 3 is a section taken on the line 3—3 of Fig. 1.
Fig. 4 is a section taken on the line 4—4 of Fig. 1.
Fig. 5 is a fragmentary section through the valve piston, taken on the line 5—5 of Fig. 1.

The valve is so constructed and arranged that when the piston 17 is in its left-hand position as shown in Fig. 1 the motor chamber 20 will be connected with the inlet chamber 19, and when the piston is in its right-hand position as shown in Fig. 2 the motor chamber will be connected with the exhaust chamber 21. Furthermore, leakage is prevented and the fluid is confined in a desired manner. These results are obtained by forming the piston with a peculiar shape and providing a type of sealing device which cooperates with the piston in a novel way. As shown, the bore 16 is provided with two circumferential grooves 27 and 28 at opposite sides of the motor chamber 20 and intermediate the latter and the chambers 19 and 21 respectively. Within these grooves 27 and 28 there are mounted annular sealing devices 29 and 30. These devices are identical, and each comprises an O-ring or torus of a suitable yieldable material such as rubber or the like. A synthetic rubber of the butadiene type has proven particularly satisfactory for this purpose. An intermediate portion of the piston 17 is provided with a cylindrical surface 32 slightly smaller in diameter than the bore 16, the ends of the surface 32 being connected to the adjacent portions of the piston by gradually tapering conical surfaces 33. The reduced cylindrical surface 32 is interrupted by three longitudinally extending grooves or channels 34, symmetrically distributed about the axis of the piston. The length of the reduced portion of the piston is such that the grooves 34 may serve as ports to connect the motor chamber 20 with the chambers 19 or 21 respectively, depending upon the position of the piston. The piston is very smoothly finished, and the corners of the grooves 34 and the edges of the tapered portions 33 are slightly rounded by means of an abrasive stone or otherwise, so that there will be no tendency to cut the O-rings.

For the best results the dimensions of the O-rings and the various parts which cooperate directly therewith should be properly proportioned. Preferably the diameter of the grooves 27—28 should be approximately equal to the outside diameter of the O-rings 29—30, and the diameter of the reduced portion 32 of the piston should be approximately equal to the inside diameter of the O-rings. Thus an O-ring will be in a substantially free or unstressed condition when the reduced portion of the piston is located adjacent thereto, as in the case of the ring 29 in Fig. 1, and in a radially compressed condition when the main portion of the piston is located adjacent thereto, as in the case of the ring 30 in Fig. 1. The diameter of the main portion of the piston should exceed the diameter of the reduced portion thereof by an amount dependent upon the size of the O-ring. With a $\frac{1}{16}$" O-ring, a difference of approximately $\frac{1}{16}$" in these two diameters will give satisfactory operation, the piston compressing the ring approximately $\frac{1}{32}$" radially. The width of the grooves 27—28 should slightly exceed the width of the unstressed O-rings in order to leave room for lateral expansion as the rings are compressed. For example, with $\frac{1}{16}$" O-rings, the grooves may be approximately $\frac{3}{32}$" wide.

Additional sealing devices may be provided to prevent external leakage of fluid from the ends of the bore 16. For this purpose the end portions of the bore are provided with circumferential grooves 37 and 38, located adjacent the chambers 19 and 21 respectively. An O-ring 39 is positioned within the groove 37, and an O-ring 40 is positioned within the groove 38, these parts preferably being of the same size and construction as the similar devices previously described.

The operation of this embodiment will now be readily apparent to those skilled in the art. With the piston 17 in its left-hand position as shown in Fig. 1, fluid will flow from the inlet chamber 19 along the channels 34 to the motor chamber 20 and thence through the opening 24 to a fluid motor or the like to actuate the same. The reduced portion 32 of the piston, which extends through the center of the O-ring 29, will hold this ring in place and prevent it from being blown out of its groove 27 by the blasting effect of the fluid, even though the latter may be at very high pressure. The compressed O-rings 30 and 39 will prevent leakage of the fluid. To reverse the motor, the piston 17 will be shifted to its right-hand position, as shown in Fig. 2. During this movement, one of the tapered portions 33 of the piston will be pushed through the O-ring 29 to compress this ring radially and at the same time the ring 30 will be relieved of compression. The compressed rings 29 and 39 will prevent leakage of the high pressure fluid from the inlet chamber 19, while fluid from the motor chamber 20 is free to exhaust through the grooves 34 chamber 21 and opening 25. The ring 30 will be retained in its groove 28 by the portion 32 of the piston, despite the high velocity of the fluid in the grooves 34. When the piston is again reversed one of the tapered portions 33 will be pushed through the O-ring 30 to compress this ring radially. Since there are no piston ports which travel across the compressed rings during the operation of the valve, cutting and tearing of the rings will be avoided. The compressed O-rings provide leakproof seals even with very high fluid pressures, as the pressure simply forces them tightly into the corner formed by the surface of the piston 17 and the adjacent side wall of the ring groove. The construction is simple, compact and inexpensive, and highly effective for its intended purpose.

Figure 6:
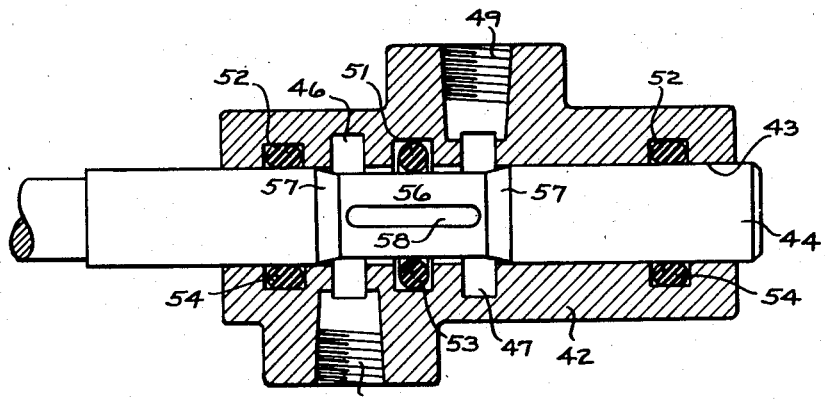
Fig. 6 is a longitudinal section through a two-way valve.
Figure 7:
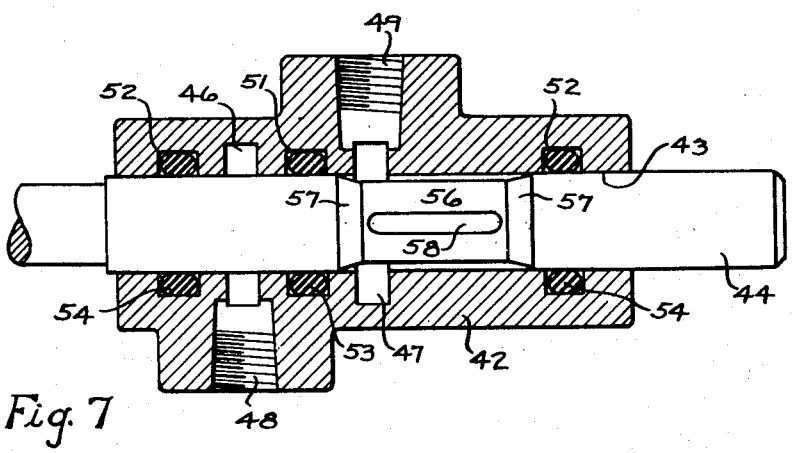
Fig. 7 is a view similar to Fig. 6 but showing the valve piston at the opposite end of its stroke.

In Fig. 6 there is illustrated an embodiment of the invention as applied to a two-way valve, shown in its open position, while Fig. 7 shows the same valve in its closed position. This embodiment comprises a valve body 42 provided with a cylindrical bore 43 therethrough for the reception of a cylindrical piston or plunger 44 which fits closely within the bore, the piston being movable by any suitable means between the positions shown in the two figures. The bore 43 is enlarged by two axially spaced circumferential grooves 46 and 47 which communicate respectively with openings 48 and 49, these openings being threaded for convenience in the making of suitable pipe connections thereto. The groove 46 may serve as an inlet chamber, and the groove 47 may serve as an outlet chamber. The bore is further provided with a circumferential groove 51 between the chambers 46 and 47, and with two circumferential grooves 52 near the opposite ends of the bore. An O-ring 53 is mounted within the groove 51, and an O-ring 54 is mounted within each of the grooves 52. An intermediate portion of the piston 44 is provided with a cylindrical surface 56 slightly smaller in diameter than the bore 43, the ends of the surface 56 being connected to the adjacent portions of the piston by gradually tapering conical surfaces 57. The reduced cylindrical surface 56 is interrupted by three longitudinally extending grooves or channels 58 (only one appearing in the drawings) symmetrically distributed about the axis of the piston. In construction and proportion, the piston, the various grooves and the O-rings are similar to the corresponding parts disclosed in Fig. 1 and already described.

The operation of this embodiment will be readily apparent. With the piston 44 in its open position, as shown in Fig. 6, fluid may flow from the inlet chamber 46 through the grooves 58 to the outlet chamber 47. The compressed rings 54 will prevent external leakage of the fluid. The reduced portion 56 of the piston will serve to hold the ring 53 in its groove 51 regardless of the fluid traveling at high velocity through the channels 58. By moving the piston to its right-hand or closed position, as shown in Fig. 7, the ring 53 will be compressed and all flow through the valve will be prevented.

Figure 8:
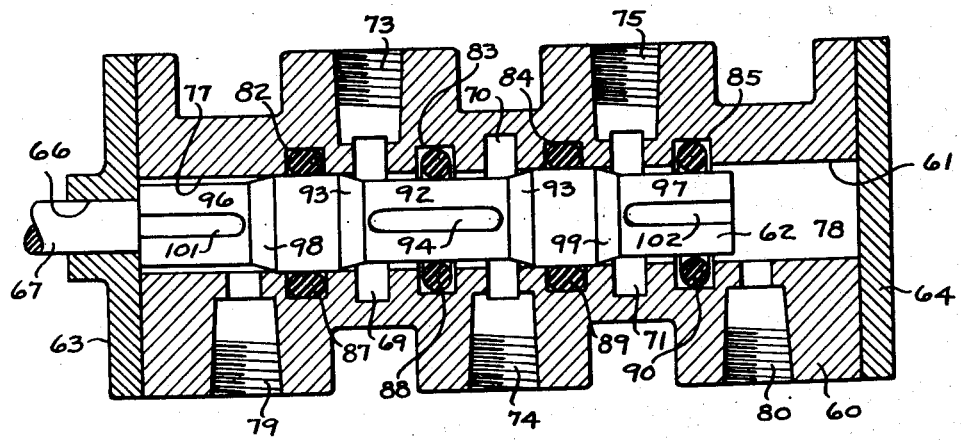
Fig. 8 is a longitudinal section through a four-way valve.
Figure 9:
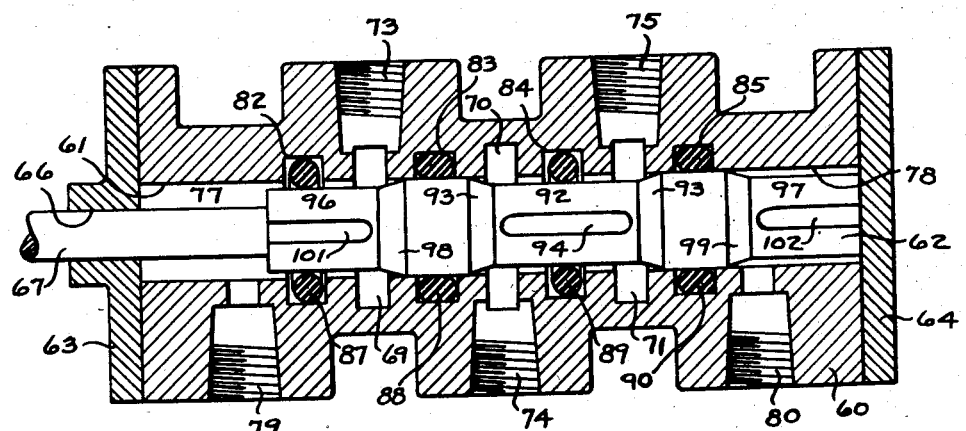
Fig. 9 is a view smiliar to Fig. 8 but showing the valve piston at the opposite end of its stroke.

In Figs. 8 and 9 there is illustrated an embodiment of the invention as applied to a four-way valve, suitable for controlling a double-acting fluid motor or similar apparatus. This embodiment comprises a valve body 60 provided with a cylindrical bore 61 therethrough for the reception of a cylindrical piston or plunger 62 which fits closely within the bore, the piston being movable by any suitable means between the positions shown in the two figures. Plates 63 and 64 are secured to the opposite ends of the valve body to close the ends of the bore, the plate 63 having a hole 66 through which there extends operating stem 67 of the piston 62. The bore 61 is enlarged by three axially spaced circumferential grooves 69, 70 and 71 which communicate respectively with openings 73, 74 and 75, these openings being threaded for convenience in the making of pipe connections thereto. The central or intermediate groove 70 may serve as an inlet chamber, and the grooves 69 and 71 may serve as "motor" chambers which will ordinarily be connected to the opposite ends of a double-acting fluid motor. The end portions of the bore 61 may serve as exhaust chambers 77 and 78 which communicate with threaded openings 79 and 80 respectively. The bore is further provided with circumferential grooves 82, 83, 84 and 85 which alternate with the chambers 77, 69, 70, 71 and 78, these grooves having O-rings 87, 88, 89, and 90 respectively mounted therein. An intermediate portion of the piston 62 is provided with a cylindrical surface 92 slightly smaller in diameter than the bore 61, the ends of the surface 92 being connected to the adjacent portions of the piston by gradually tapering conical surfaces 93. The reduced cylindrical surface 92 is interrupted by three longitudinally extending grooves or channels 94 (only one appearing in the drawings) symmetrically distributed about the axis of the piston. The opposite end portions of the piston are similarly provided with reduced cylindrical surfaces 96 and 97 which are connected with the adjacent portions of the piston by gradually tapering conical surfaces 98 and 99 respectively. These cylindrical surfaces 96 and 97 are interrupted by longitudinally extending grooves or channels 101 and 102 respectively. In construction and proportion, the piston, the various grooves and the O-rings are similar to the corresponding parts disclosed in Fig. 1 and already described.

The operation of this embodiment will be readily apparent. With the piston 62 in its left-hand position, as shown in Fig. 8, fluid may flow from the inlet chamber 70 through the channels 94 to the motor chamber 69 and thence outwardly through the opening 73 to a fluid motor or other device. At the same time, exhaust fluid from the motor may enter the motor chamber 71 through the opening 75, flow along the channels 102 to the exhaust chamber 78 and thence escape through the opening 80. The compressed O-rings 87 and 89 will prevent leakage of the high-pressure fluid. To reverse the motor, the valve piston 62 will be shifted to its right-hand position, as shown in Fig. 9. This will cause fluid to flow from the inlet chamber 70 through the channels 94 to the motor chamber 71 and thence outwardly through the opening 75 to the motor. At the same time, the motor will exhaust fluid through the opening 73, channels 101, exhaust chamber 77, and opening 79. Leakage of the high-pressure fluid will be prevented by the compressed O-rings 88 and 90. In both positions of the piston, the unstressed O-rings will be held in their grooves by the reduced portions of the piston which extend therethrough. As the piston travels from one position to the other, the two previously compressed rings will be relieved of stress and the previously unstressed rings will be compressed radially by the passage of the tapered portions of the piston therethrough.

The invention is well adapted for use in various types of reciprocating valves, and the arrangement of ports through which the fluid enters and leaves the valve body may be altered to suit different installations. The O-rings provide a very tight seal, which will give satisfactory service even with gases, such as air, and at very high pressures. There will be no tendency to cut or tear the O-rings during the operation of the valve, since the rings are free from compressive stress when the piston ports are moving past the rings. Consequently the rings will have a long life of useful service. The valve is simple in construction and it will be relatively inexpensive to manufacture.

It is obviously immaterial, so far as the control of fluid flow is concerned, whether the valve piston or the valve body is movable, so long as these parts are relatively slidable, and it is not intended that the claims be construed as limited to valves having stationary valve bodies.

Having thus described my invention, what I claim as new and desire to secure by Letters Patent is:

1. A valve comprising a body provided with a cylindrical bore having a circumferential groove therein and two ports communicating with the bore at opposite sides of the groove, a valve piston mounted in the bore to control the flow of fluid between the ports and having a cylindrical portion which fits the bore closely, the piston and body being relatively slidable in the direction of the axis of the bore, and a ring of yieldable material mounted in the groove, the ring when unstressed having an inside diameter somewhat less than the diameter of the bore so that the cylindrical portion of the piston may stress the ring to prevent leakage of fluid past the same, the piston also having a portion of reduced diameter connected to the cylindrical portion by a gradually tapered surface, the diameter of the reduced portion being substantially equal to the inside diameter of the unstressed ring, the reduced portion having one or more longitudinally extending grooves therein to permit fluid flow between the ports when the piston and body are so positioned relatively as to bring the reduced portion within the ring.

2. A valve comprising a body provided with a cylindrical bore having a circumferential groove therein and two ports communicating with the bore at opposite sides of the groove, a valve piston mounted in the bore to control the flow of fluid between the ports and having a cylindrical portion which fits the bore closely, the piston and body being relatively slidable in the direction of the axis of the bore, and an O-ring of rubber or the like mounted in the groove, the O-ring when unstressed having an inside diameter somewhat less than the diameter of the bore so that the cylindrical portion of the piston may stress the O-ring to prevent leakage of fluid past the same, the piston also having a portion of reduced diameter connected to the cylindrical portion by a gradually tapered surface, the diameter of the reduced portion being substantially equal to the inside diameter of the unstressed O-ring, the reduced portion having one or more longitudinally extending grooves therein to permit fluid flow between the ports when the piston and body are so positioned relatively as to bring the reduced portion within the O-ring.

3. A valve comprising a body provided with a cylindrical bore having a circumferential groove therein and two ports communicating with the bore at opposite sides of the groove, an O-ring of rubber or the like mounted in the groove, the O-ring when unstressed having a width slightly less than the width of the groove, an outside diameter substantially equal to the diameter of the groove, and an inside diameter somewhat less than the diameter of the bore, and a valve piston mounted in the bore to control the flow of fluid between the ports, the piston and body being relatively slidable in the direction of the axis of the bore, the piston having a cylindrical portion which fits the bore closely and serves to compress the O-ring radially and prevent leakage of fluid past the same, the piston also having a portion of reduced diameter connected to the cylindrical portion by a gradually tapered surface, the diameter of the reduced portion being substantially equal to the inside diameter of the unstressed O-ring, the reduced portion having one or more longitudinally extending grooves therein to permit fluid flow between the ports when the piston and body are so positioned relatively as to bring the reduced portion within the O-ring.

MYLES MORGAN.

REFERENCES CITED

The following references are of record in the file of this patent:

UNITED STATES PATENTS

| Number | Name | Date |
| --- | --- | --- |
| 453,017 | May | May 26, 1891 |
| 1,988,545 | Donn | Jan. 22, 1935 |
| 2,360,733 | Smith | Oct. 17, 1944 |
| 2,414,451 | Christensen | Jan. 21, 1947 |

FOREIGN PATENTS

| Number | Country | Date |
| --- | --- | --- |
| 166,619 | Great Britain | 1921 |